United States Patent
Ahn et al.

(10) Patent No.: US 9,383,981 B2
(45) Date of Patent: Jul. 5, 2016

(54) METHOD AND APPARATUS OF INSTRUCTION SCHEDULING USING SOFTWARE PIPELINING

(71) Applicant: SAMSUNG ELECTRONICS CO., LTD., Suwon-si, Gyeonggi-do (KR)

(72) Inventors: Min-wook Ahn, Seoul (KR); Won-sub Kim, Anyang-si (KR); Tai Song Jin, Seoul (KR); Seung-won Lee, Hwaseong-si (KR); Jin-seok Lee, Seoul (KR); Chae-seok Im, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/508,318

(22) Filed: Oct. 7, 2014

(65) Prior Publication Data

US 2015/0106603 A1     Apr. 16, 2015

(30) Foreign Application Priority Data

Oct. 7, 2013  (KR) .......................... 10-2013-0119450

(51) Int. Cl.
  *G06F 9/30*  (2006.01)
  *G06F 9/45*  (2006.01)
(52) U.S. Cl.
  CPC .................. *G06F 8/4452* (2013.01)

(58) Field of Classification Search
  CPC ...... G06F 8/40; G06F 9/30065; G06F 8/4452
  USPC ........................................... 717/161; 712/241
  See application file for complete search history.

(56) References Cited

U.S. PATENT DOCUMENTS

| | | | |
|---|---|---|---|
| 6,671,878 B1 | 12/2003 | Bliss | |
| 8,266,610 B2* | 9/2012 | Martin | G06F 8/4452 717/154 |
| 2003/0233643 A1* | 12/2003 | Thompson | G06F 8/4452 717/161 |
| 2008/0104373 A1* | 5/2008 | Martin | G06F 9/3838 712/216 |
| 2015/0100950 A1* | 4/2015 | Ahn | G06F 8/443 717/161 |

OTHER PUBLICATIONS

Rau, "Iterative Modulo Scheduling", *The International Journal of Parallel Processing*, Feb. 1996, 68 pp., vol. 24, No. 1.

* cited by examiner

*Primary Examiner* — John Chavis
(74) *Attorney, Agent, or Firm* — Staas & Halsey LLP

(57) ABSTRACT

A modulo scheduling method including calculating at least two candidate initiation intervals between adjacent iterations, searching for schedules of the instructions in parallel by using the candidate initiation intervals, and selecting a schedule determined to be valid from among the searched schedules.

18 Claims, 8 Drawing Sheets

METHOD AND APPARATUS OF INSTRUCTION SCHEDULING USING SOFTWARE PIPELINING

CROSS-REFERENCE TO RELATED APPLICATIONS

This application claims the priority benefit of Korean Patent Application No. 10-2013-0119450, filed on Oct. 7, 2013, in the Korean Intellectual Property Office, the disclosure of which is incorporated herein in their entirety by reference.

BACKGROUND

1. Field

One or more embodiments of the present invention relate to a modulo scheduling method, which is one form among software pipelining techniques, and an apparatus for performing the method.

2. Description of the Related Art

A repeatedly performed loop causes a massive amount of calculations during data processing of a processor and occupies a significant portion of the overall data processing time. To reduce loads for processing such loops, various software pipelining techniques have been suggested.

A modulo scheduling technique is a scheduling technique for reducing loop processing time by changing a loop, such that a plurality of iterations of the loop are performed in parallel. According to a modulo scheduling technique, $n+1^{th}$ iteration of a loop is not initiated after $n^{th}$ iteration of the loop is completed. Rather, the $n+1^{th}$ iteration is initiated while the $n^{th}$ iteration is being processed. As the $n^{th}$ iteration and the $n+1^{th}$ iteration of the loop are pipelined, the $n^{th}$ iteration and the $n+1^{th}$ iteration may be processed in parallel.

In a modulo scheduling method, it is very important to optimize initiation interval (II), which is a difference between an initiation time of the $n^{th}$ iteration and an initiation time of the $n+1^{th}$ iteration, to reduce the overall loop processing time. However, it takes a long period of time to find an optimized initiation interval II.

SUMMARY

Provided are a modulo scheduling method capable of quickly finding an optimized initiation interval (II) and an apparatus for performing the method.

According to an aspect of the present invention, a method of modulo scheduling instructions for processing a loop. The method provided includes calculating at least two candidate initiation intervals between adjacent iterations, searching for schedules of the instructions in parallel by using the candidate initiation intervals, and selecting a schedule determined to be valid from among the searched schedules.

According to another aspect of the present invention, there is provided a computer readable recording medium having recorded thereon program codes for implementing the above method.

According to another aspect of the present invention, an instruction scheduling apparatus including a memory, which stores instructions for processing a loop, and a modulo scheduler, which analyzes the instructions and schedules operation of a processor for processing the loop, wherein the modulo scheduler calculates at least two candidate initiation intervals between adjacent iterations, searches for schedules of the instructions in parallel by using the candidate initiation intervals, and selects a schedule determined to be valid from among the searched schedules.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of embodiments, taken in conjunction with the accompanying drawings in which.

DETAILED DESCRIPTION

Figures 1A, 1B:
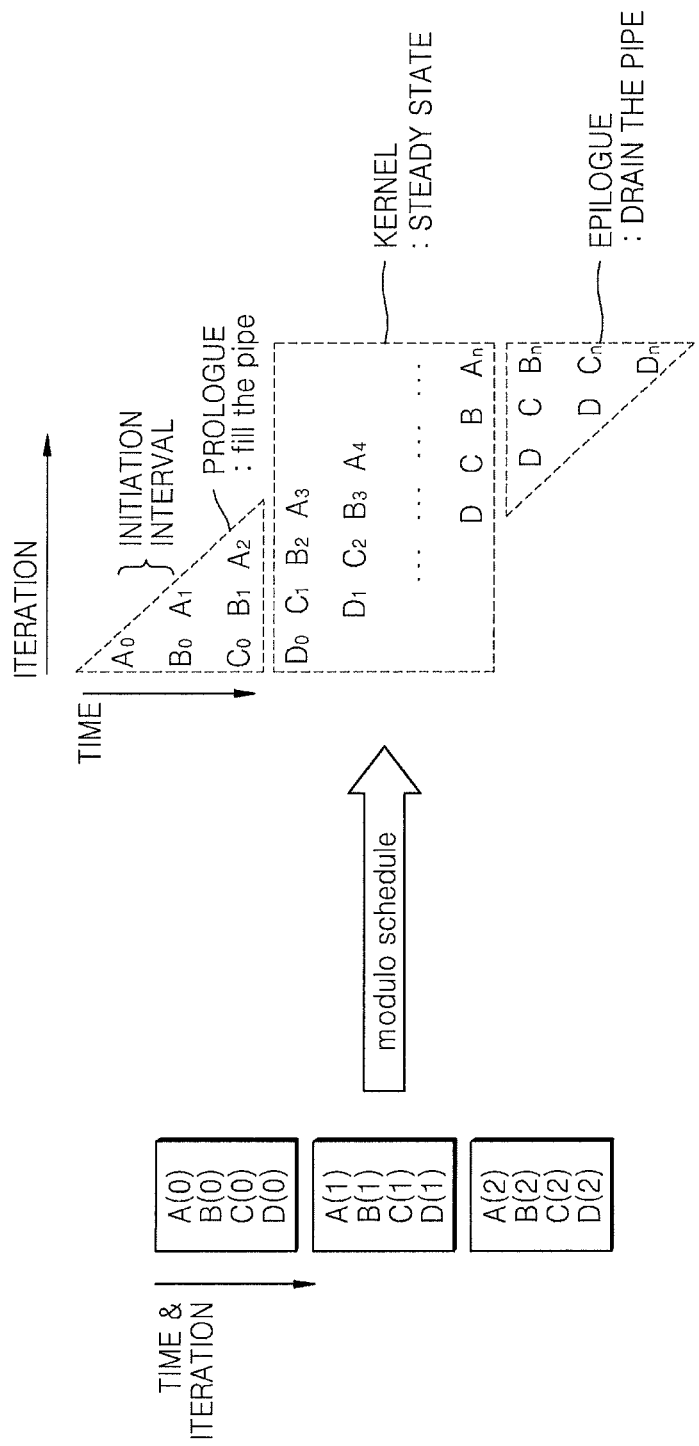
FIGS. 1A and 1B are diagrams for describing the concept of a general modulo scheduling technique.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, the embodiments are merely described below, by referring to the figures, to explain aspects of the present description.

FIGS. 1A and 1B are diagrams describing the concept of a general modulo scheduling technique. FIG. 1A shows a general loop processing operation that is not modulo scheduled, whereas FIG. 1B shows a loop processing operation in case where the loop processing operation as shown in FIG. 1A is modulo scheduled. It is assumed that a loop to be processed in FIGS. 1A and 1B includes codes as shown in Table 1 below.

TABLE 1

| for i = 0 to n-1 |
| --- |
| A(i); |
| B(i); |
| C(i); |
| D(i); |
| end |

As shown in FIG. 1A, iterations i=0 through i=n−1 are performed in the chronological order. In other words, the iteration i=1 is performed after the iteration i=0 is completed. A period of time for processing the loop as shown in FIG. 1A may be defined as shown in Equation 1 below.

$$n*SL \qquad \text{[Equation 1]}$$

In the Equation 1, SL denotes length of a schedule for processing a single loop. Therefore, according to the method as shown in FIG. 1A, a period of time for processing a loop is proportional to both SL and n.

As shown in FIG. 1B, the iteration i=0 through i=n−1 are performed in parallel at a designated interval. In other words, the iteration i=1 is initiated at a designated interval after the iteration i=0 is initiated. Here, a difference between iterations adjacent to each other is referred to as an initiation interval and is generally abbreviated to II. According to the method as shown in FIG. 1B, iterations overlap one another in a horizontal direction, and thus a loop may be processed more efficiently than the method shown in FIG. 1A.

Meanwhile, the triangular portion at which modulo scheduling is initiated is referred to as a prologue, the filled portion that may be pipelined is referred to as a kernel, and the reversed-triangular portion at which modulo scheduling is completed is referred to as an epilogue. For the method shown in FIG. 1B to obtain high loop processing efficiency than the method shown in FIG. 1A, it is necessary to make the prologue and the kernel as short as possible and to make the kernel as wide as possible. In other words, to improve efficiency of the method shown in FIG. 1B, it is necessary to minimize the initiation interval II, as defined in Equation 2 below.

$$(n-1)*II+SL \qquad \text{[Equation 2]}$$

If n is sufficiently large, the SL may be ignored in the overall cycle for processing a loop, and thus the initiation interval II may be considered as the most important factor regarding efficiency of a loop process that is modulo scheduled. Therefore, the minimization of the initiation interval II is directly related to a loop processing efficiency.

In the related art, it takes a very long period of time for finding a minimized initiation interval II. Here, finding a minimized initiation interval II is different from finding the theoretically minimum initiation interval MII. Depending on the theoretically minimum initiation interval MII, it may be impossible to schedule instructions. On the contrary, the minimized initiation interval II refers to an initiation interval II corresponding to the fastest schedule from among schedules that may actually be performed.

It may be impossible to schedule instructions depending on the theoretically minimum initiation interval MII, because, for example, constraints of hardware resources and limits due to dependences of instructions are not simultaneously considered and schedules for processing other instructions unrelated to a loop and interruptions are not considered in the theoretically minimum initiation interval MII.

Therefore, in an actual scheduling embodiment, it is determined whether a schedule may actually be processed, by substituting candidate values for the initiation interval II one-by-one. For example, in the related art, a schedule is searched for at the initiation interval II=1 and determines whether the searched schedule is valid. If the searched schedule is not valid, the initiation interval II is increased by 1. Next, a schedule is searched for at the initiation interval II=2 and it is determined whether the searched schedule is valid. In this regard, the above-stated operations are repeated by gradually increasing the initiation interval II until a valid schedule is found.

However, in the related art, if the initial initiation interval II is a very small value and a valid schedule is found at a very large initiation interval II, it takes a very long period of time for scheduling. For example, if a scheduling is performed during a compilation of a compiler, the overall compilation time increases for finding an optimized minimum initiation interval II.

Figure 2:
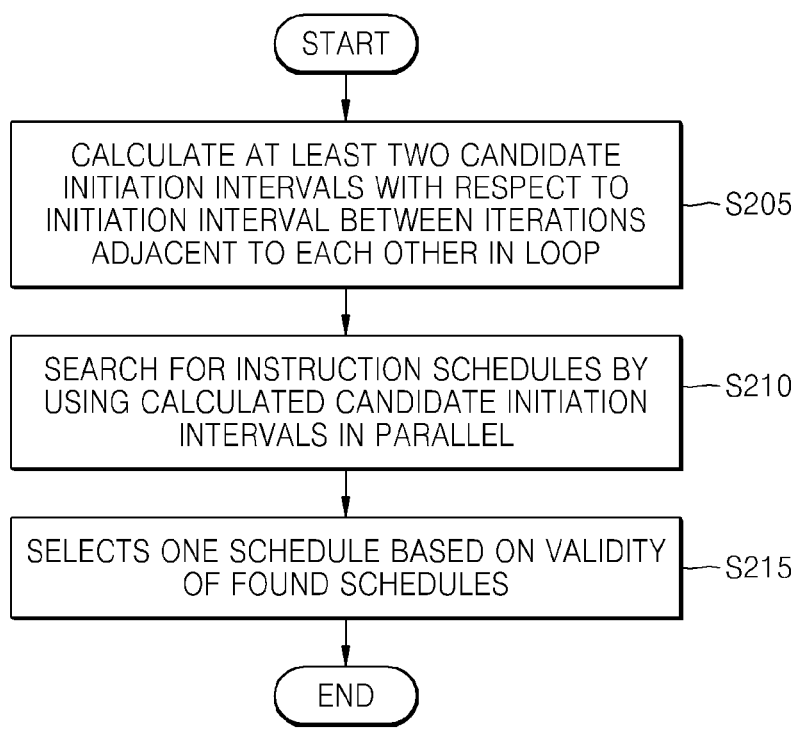
FIG. 2 is a diagram showing a flow of a modulo scheduling method according to an embodiment of the present invention.
Figure 7:
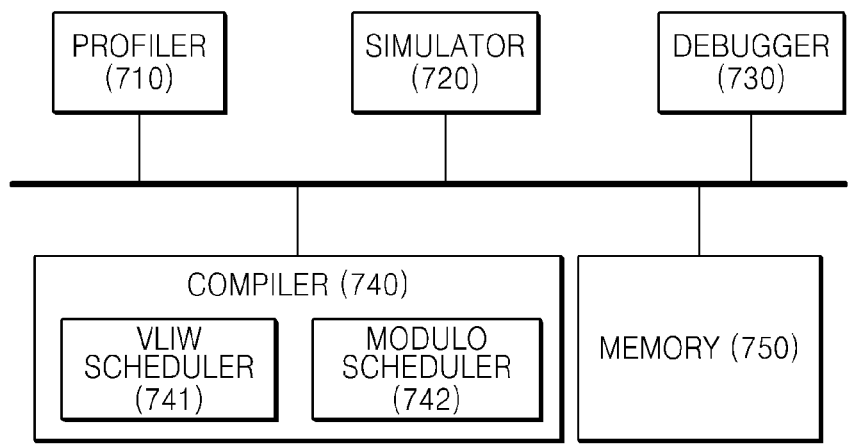
FIG. 7 is a diagram showing a scheduling apparatus according to an embodiment of the present invention.
Figure 9:
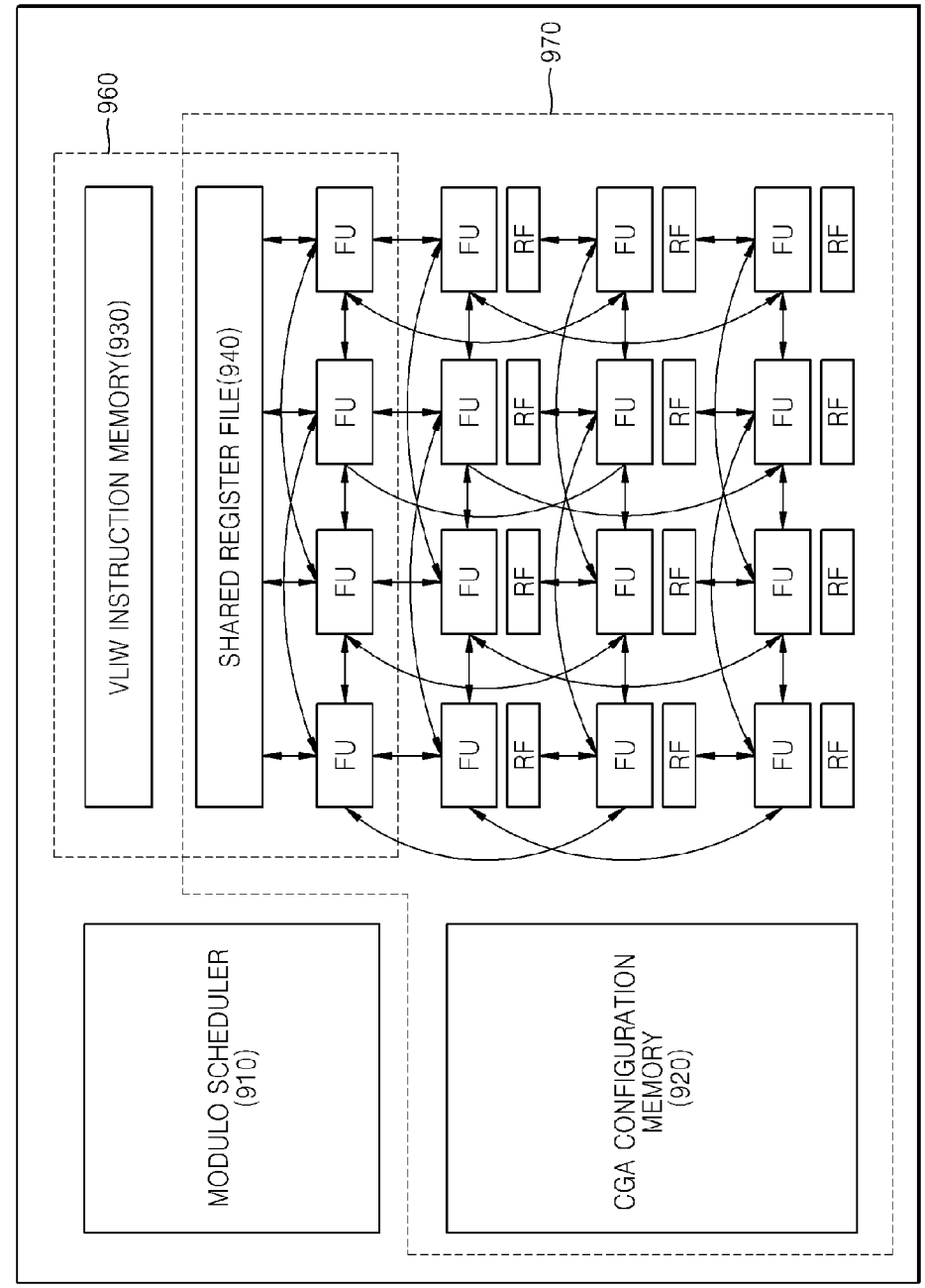
FIG. 9 is a diagram showing a scheduling apparatus according to another embodiment of the present invention.

FIG. 2 is a diagram showing the flow of a modulo scheduling method according to an embodiment of the present invention. The method shown in FIG. 2 may be performed by a scheduling apparatus 70 as shown in FIG. 7 or a scheduling apparatus 90 as shown in FIG. 9. Hereinafter, for convenience of explanation, it is assumed that the scheduling apparatus 70 performs the method shown in FIG. 2.

Referring to FIG. 2, the scheduling apparatus 70 calculates at least two candidate initiation intervals with respect to an initiation interval II between iterations adjacent to each other in a loop (operation S205). The candidate initiation intervals may be calculated in any of various methods. Hereinafter, it is assumed that the number of calculated candidate initiation intervals is n (n is a natural number equal to or greater than 2).

For example, if it is the first time for the scheduling apparatus 70 to search for candidate initiation intervals, n candidate initiation intervals may be found by regularly increasing a minimum initiation interval MII calculated in advance. For example, the $i^{th}$ candidate initiation interval CanII[i] from among the total n candidate initiation intervals may be calculated as shown in Equation 3 below.

$$\text{CanII}[i]=\text{MII}+d*(i-1), \text{ where } 0<i\le n \qquad \text{[Equation 3]}$$

Here, d is an arbitrary natural number and may vary according to embodiments. If d=1, candidate initiation intervals are MII, MII+1, . . . , and MII+n−1.

If the scheduling apparatus 70 searches for schedules based on the n candidate initiation intervals and no valid schedule is found, the scheduling apparatus 70 calculates another set of n candidate initiation intervals. At this point, the previously calculated candidate initiation intervals are updated accordingly to a designated rule. For example, if the largest value from among the previously calculated candidate initiation intervals is denoted by PreII, the n candidate initiation intervals may be calculated as shown in Equation 4 below.

$$\text{CanII}[i]=\text{PreII}+d*(i-1), \text{ where } 0<i\le n \qquad \text{[Equation 4]}$$

However, the present invention is not limited thereto, and the scheduling apparatus 70 may calculate n candidate initiation intervals according to any of various rules.

For example, the scheduling apparatus 70 may calculate n candidate initiation intervals within a designated range. The range of calculation may be limited by [minimum MinII, maximum MaxII]. The minimum MinII may be the largest value from among the previously calculated candidate initiation intervals, with which no valid schedule is found, plus 1. The maximum MaxII may be length of a loop or the smallest value from among the previously calculated candidate initiation intervals, with which a valid schedule is found, minus 1. The scheduling apparatus 70 may either extract n candidate initiation intervals at a constant interval or randomly extract n candidate initiation intervals within the range of calculation.

It would have been obvious to one of ordinary skill in the art that, aside from the above-stated embodiments, the scheduling apparatus 70 may calculate n candidate initiation intervals in any of various ways for simultaneously searching for n instruction schedules in parallel.

The scheduling apparatus 70 searches for instruction schedules by using the calculated candidate initiation intervals (operation S210). For example, the scheduling apparatus 70 searches for n schedules with respect to n candidate initiation intervals. The expression that scheduling apparatus 70 searches for a schedule refers to instructions of a loop that are allocated to function units or register files of a processor on time basis according to a given candidate initiation interval. Here, the function unit is also referred to as a processing element. Examples of the function units include an Arithmetic Logic Unit (ALU), a comparer, an adder, a multiplier, a shifter, and a load/store unit. However, the present invention is not limited thereto.

Since a processor may include a plurality of function units and register files, there may be a plurality of number of cases in terms of searching for a schedule with respect to a single candidate initiation interval. The scheduling apparatus 70 attempts schedule configuration with respect to a plurality of cases according to a designated rule. No schedule may be found with respect to all cases, or executable schedules may be found with respect to a part of the cases. For example, it may be impossible to configure a schedule at a prologue with respect to a particular case, or it may be impossible to configure a schedule at a kernel with respect to another particular case.

Meanwhile, a processor is the subject which will actually execute instructions of a loop. The processor may be the processor of the scheduling apparatus 70 or the processor of an external apparatus different from the scheduling apparatus 70. For example, the scheduling apparatus 70 may be the subject for autonomously processing a loop, and the scheduling apparatus 70 may schedule, such that instructions for processing the loop are executed by the processor of the scheduling apparatus 70.

Alternatively, the scheduling apparatus 70 may be a PC for compiling program codes including a loop, and actually compiled instructions may be executed by the processor of a smart phone. For example, the processor of the PC performs a scheduling, and scheduled instructions may be executed by the processor of the smart phone. The PC searches for schedules in consideration of hardware configuration and instruction set architecture (ISA) of the processor of the smart phone, so that instructions may be executed by the processor of the smart phone. For example, information regarding the processor of the smart phone including the types and the number of function units of the processor, the number of register files, connection relationships between the function units, and connection relationships between the function units and the register files may be considered.

The scheduling apparatus 70 uses n schedulers for simultaneously searching for n schedules. For example, each of the n schedulers receives input of one candidate initiation interval and searches for an executable schedule with respect to the input candidate initiation interval. Each scheduler may search for a schedule by generating a modulo reservation table (MRT) with respect to the input candidate initiation interval. A MRT is a table for detecting an overlapping resource request from another iteration, where a scheduler may search for all schedules by generating a MRT with respect to the kernel. Since the kernel has the greatest pipelining depth, if a MRT may be configured with respect to the kernel, MRTs may be configured with respect to the prologue and the epilogue. In other words, a MRT with respect to the kernel may be considered as a MRT with respect to loop instructions.

A MRT is a table in which function units and register files are arranged in columns and cycles are arranged in rows, where the number of rows is determined based on the number of candidate initiation intervals. For example, if the number of candidate initiation intervals input to a scheduler is 4, the schedule configures a MRT having 4 rows. For example, when a MRT may be configured by using 4 function units and one register file with respect to 4 candidate initiation intervals and 6 instructions, the MRT may be as shown in Table 2.

TABLE 2

|       | FU0              | FU1             | FU2                | FU3 | RF                |
|-------|------------------|-----------------|--------------------|-----|-------------------|
| T = 0 |                  | Instruction 3(i) |                    |     | Instruction 0(i + 1) |
| T = 1 |                  |                 | Instruction 1(i + 1) |     | Instruction 4(i + 1) |
| T = 2 | Instruction 5(i + 1) |             |                    |     |                   |
| T = 3 |                  |                 |                    |     | Instruction 2(i + 1) |

N schedulers may be embodied as either exclusive hardware for searching for schedules or a software module. For example, a software module corresponding to the n schedulers of the scheduling apparatus 70 may be generated, and the generated software module may be executed by the processor of the scheduling apparatus 70. Alternatively, if the scheduling apparatus 70 includes n hardware schedulers, n candidate initiation intervals may be input to the n hardware schedulers, respectively.

According to an embodiment of the present invention, since n schedules are simultaneously searched for with respect to n candidate initiation intervals, a minimized candidate initiation interval may be found in a period of time that is about 1/n of a period of time corresponding to a case of searching for one schedule with respect to one candidate initiation interval.

Here, n may be adjusted based on performance of the processor of the scheduling apparatus 70 or hardware configuration of the scheduling apparatus 70. For example, n may be the maximum number of schedules that may be simultaneously searched for by the scheduling apparatus 70.

The scheduling apparatus 70 selects a schedule based on validity of found schedules (operation S215). The scheduling apparatus 70 determines validity of found schedules in the operation S210. A schedule being valid indicates that there is an executable schedule with respect to a given candidate initiation interval. If a schedule is valid, a MRT may be generated with respect to a given initiation interval.

If $m(0<n\le m)$ valid schedules are found with respect to n candidate initiation intervals, the scheduling apparatus 70 selects one from among the m valid schedules. The scheduling apparatus 70 may select the schedule having the fastest speed of processing the loop from among the m valid schedules. There are M candidate initiation intervals corresponding to the m valid schedules, where the scheduling apparatus 70 may select one schedule based on sizes of the m candidate initiation intervals. For example, the scheduling apparatus 70 may select a schedule corresponding to the smallest initiation interval from among the m candidate initiation intervals.

Meanwhile, if it is determined that all schedules with respect to the n candidate initiation intervals are not valid, the scheduling apparatus 70 updates the n candidate initiation intervals. For example, the scheduling apparatus 70 may update the n candidate initiation intervals by increasing each of the n candidate initiation intervals by n. The updating of the n candidate initiation intervals may be considered as returning to the operation S205.

As described above, the scheduling apparatus 70 may perform scheduling by performing the operations S205 through S215 reflexively.

Figure 3:
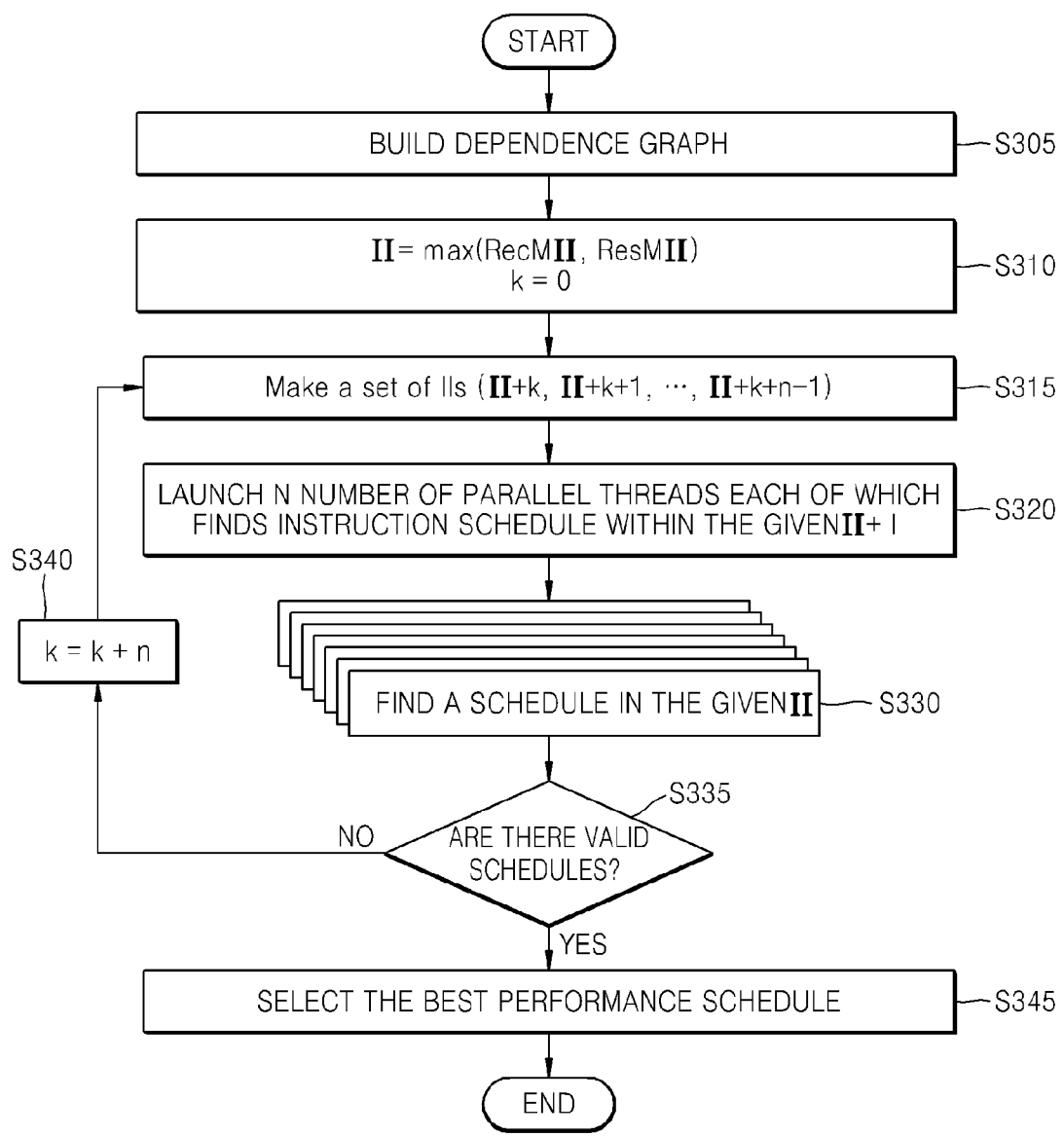
FIG. 3 is a flowchart showing a modulo scheduling method according to another embodiment of the present invention.

FIG. 3 is a flowchart showing a modulo scheduling method according to another embodiment of the present invention. The method shown in FIG. 3 may be performed by the scheduling apparatus 70 shown in FIG. 7 or the scheduling apparatus 90 shown in FIG. 9. Hereinafter, for convenience of explanation, it is assumed that the scheduling apparatus 70 performs the method shown in FIG. 3.

Referring to FIG. 3, the scheduling apparatus 70 analyzes dependences between instructions for processing a loop and builds a dependence graph (operation S305). Generally, instructions of a loop may be dependent on one another, where dependences between instructions may be roughly categorized as inter-iteration dependence and intra-iteration dependence. Such dependent relationships may be expressed as a dependence graph. In a dependence graph, instructions are shown as vertexes, and each dependence may be shown as an edge or an arrow.

Figure 4:
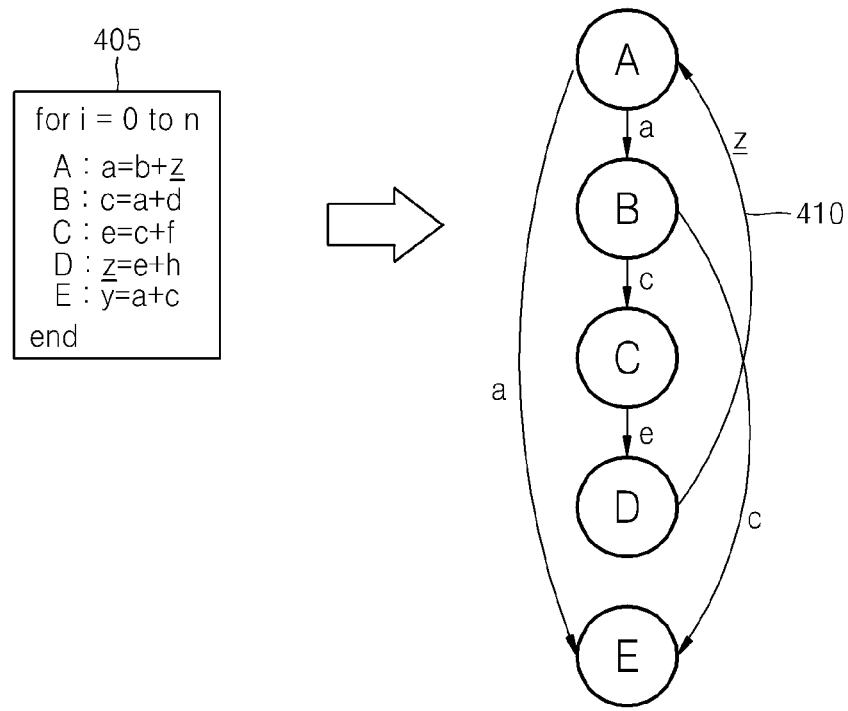
FIG. 4 is a diagram showing a dependence graph according to an embodiment of the present invention.

FIG. 4 is a diagram showing a dependence graph. A dependence graph with respect to an instruction 405 shown in FIG. 4 may be denoted by the reference numeral 410. On the dependence graph 410, arrows pointing downward indicate intra-iteration dependences, whereas arrows pointing upward indicate inter-iteration dependences. For example, on the dependence graph 410, A is intra-iteration dependent on B and E and is inter-iteration dependent on D. In the codes 405, A is executed by using z calculated by D of a previous iteration. Therefore, A may be executed after the D of the previous iteration is executed.

The scheduling apparatus 70 calculates a minimum initiation interval MII (operation S310). In the operation S310, II=max(RecMII, ResMII) denotes calculation of the minimum initiation interval MII. k denotes a parameter for calculating n candidate initiation intervals. Here, k=0.

The minimum initiation interval MII is selected as having the greater value between ResMII and RecMII. Here, ResMII is a smallest initiation interval calculated in consideration of resource constraint, whereas RecMII is a smallest initiation interval calculated in consideration of recurrent constraint. The resource constraint refers to a pipelining constraint due to hardware configuration of a processor for processing a loop, whereas the recurrent constraint refers to a pipelining constraint based on dependences of instructions for processing a loop.

Figures 5A, 5B, 5C:
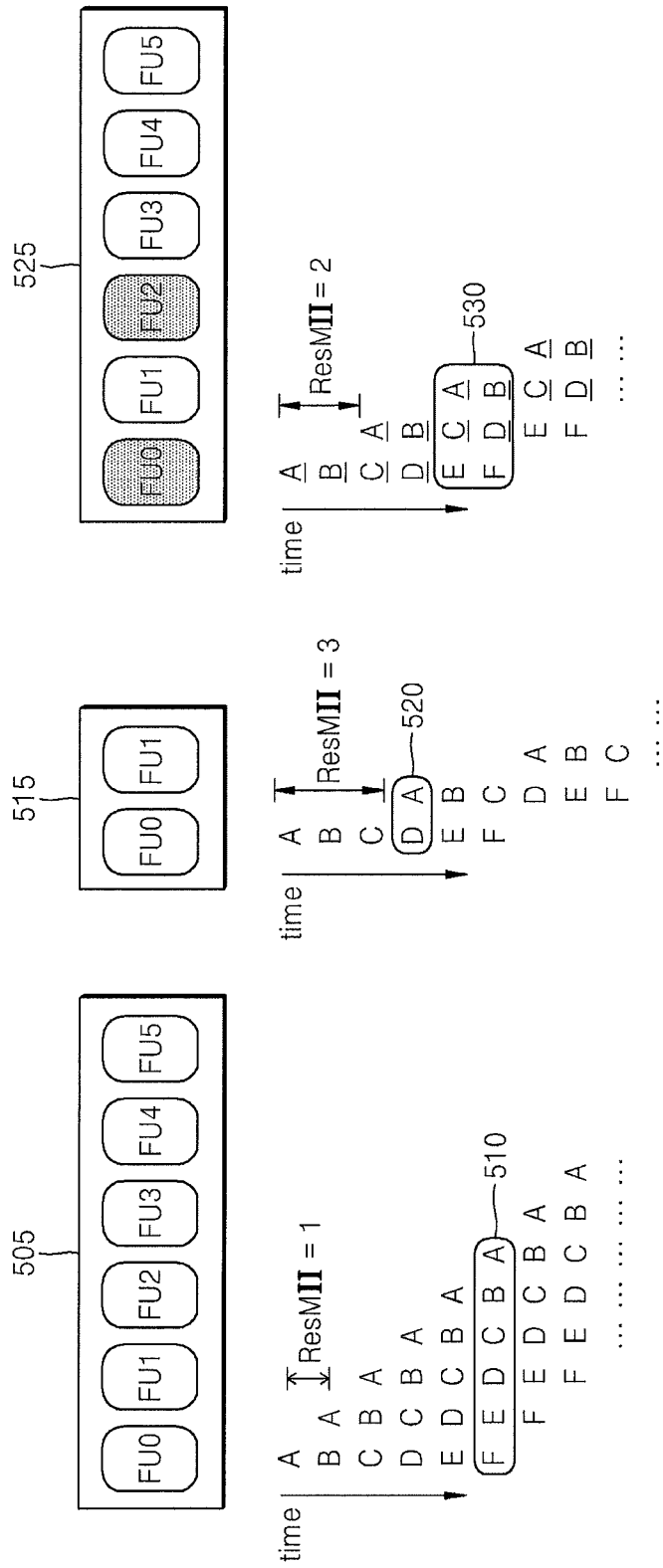
FIGS. 5A, 5B and 5C are diagrams describing an initiation interval ResII due to a recurrent constraint according to an embodiment of the present invention.

FIGS. 5A, 5B and 5C show different hardware configuration examples (a), (b), and (c) for calculating a ResMII. It is assumed that FIGS. 5A, 5B and 5C are scheduled according to the loop as in table 3. FIG. 3 includes 6 instructions, where A, B, C, and D are type 1 instructions and E and F are type 2 instructions. Dependences between the 6 instructions are not considered.

TABLE 3

| for i = 0 to n-1 |
| --- |
| A(i); # Type 1 |
| B(i); # Type 1 |
| C(i); # Type 1 |
| D(i); # Type 1 |
| E(i); # Type 2 |
| F(i); # Type 2 |
| end |

In FIG. 5A, a processor 505 includes 6 function units, where it is assumed that all 6 functions units are capable of executing both type 1 and type 2 instructions. Since 6 instructions may be simultaneously executed by the 6 function units included in the processor 505, the kernel may be scheduled as indicated by the reference numeral 510. Here, ResMII is 1.

In FIG. 5B, a processor 515 includes 2 function units, where it is assumed that the all 2 functions units are capable of executing both type 1 and type 2 instructions. Since only 2 instructions may be simultaneously executed, the kernel may be scheduled as indicated by the reference numeral 520. Here, ResMII is 3.

In FIG. 5C, a processor 525 includes 6 function units, where it is assumed that the function units FU0 and FU2 are only capable of executing type 1 instructions and the other function units are only capable of executing type 2 instructions. Here, since only 2 instructions from among the instructions A, B, C, and D may be simultaneously executed, the kernel is scheduled as indicated by the reference numeral 530. Here, ResMII is 2.

Figure 6A:
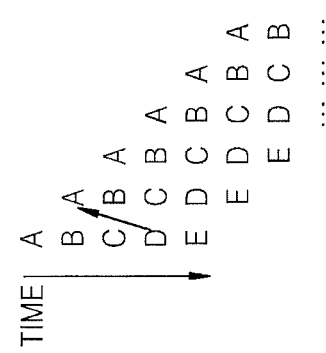
FIGS. 6A and 6B are diagrams describing an initiation interval RecII due to a recurrent constraint according to an embodiment of the present invention.
Figure 6B:
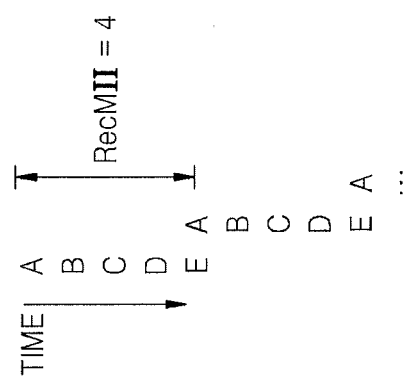

FIGS. 6A and 6B are diagrams describing an iteration RecII due to a recurrent constraint. FIG. 6 shows a schedule for processing the codes 405 of FIG. 4. In FIGS. 6A and 6B, resource constraint is not considered.

As indicated with an arrow in FIG. 6A, D of the $n^{th}$ iteration and A of the $n+1^{th}$ iteration are dependent on each other. Therefore, it is necessary to schedule instructions as shown in FIG. 6B, where RecMII is 4.

Referring back to FIG. 3, the scheduling apparatus 70 calculates n candidate initiation intervals (operation S315). The n candidate initiation intervals may be calculated by using the minimum initiation interval MII calculated in the operation S310 and the parameter k. For example, the scheduling apparatus 70 may calculate the n candidate initiation intervals by increasing minimum initiation interval MII+k by 1.

The scheduling apparatus 70 launches n parallel threads for searching for instruction schedules with respect to the n calculated candidate initiation intervals, respectively (operation S320). For example, the scheduling apparatus 70 generates n schedulers which operate in parallel.

The scheduling apparatus 70 searches for schedules with respect to the n candidate initiation intervals by using the n parallel threads, respectively (operation S330). N schedules may be searched for with respect to the n candidate initiation intervals in parallel.

The scheduling apparatus 70 determine whether a valid schedule is found as a result of the search (operation S335). The determination of validity of a schedule is as described above with reference to FIG. 2.

If all of the n searched schedules are determined as not valid, the scheduling apparatus 70 increases the parameter k by n (operation S340) and calculates new n candidate initiation intervals (the operation S315). The newly calculated n candidate initiation intervals are values obtained by increasing the previously calculated n candidate initiation intervals by the number n of the candidate initiation intervals, respectively.

If it is determined that valid schedules exist, a schedule exhibiting the best performance is selected from among the valid schedules (operation S345). For example, if there is only one valid schedule, the scheduling apparatus 70 selects the schedule. If there are two or more valid schedules, the scheduling apparatus 70 selects the shortest schedule from among the valid schedules. In other words, the scheduling apparatus 70 selects a schedule corresponding to the shortest initiation interval.

FIG. 7 is a diagram showing the scheduling apparatus 70 according to an embodiment of the present invention. The scheduling apparatus 70 shown in FIG. 7 includes a profiler 710, a simulator 720, a debugger 730, a compiler 740, and a memory 750. However, not all of the components shown in FIG. 7 are essential components, and the scheduling apparatus 70 may be embodied with a smaller number of components. Furthermore, other general-purpose components not shown in FIG. 7 may be further included in the scheduling apparatus 70.

In the scheduling apparatus 70, the profiler 710, the simulator 720, the debugger 730, the compiler 740, and the memory 750 may embody a single software development kit (SDK).

The compiler 740 converts written program codes into a low-level language. For example, the compiler 740 converts program codes written in a high-level language into the assembly language or the machine language. The compiler 740 schedules instructions converted into the assembly language or the machine language. The compiler 740 may use information stored in the memory 750 for compilation of written program codes.

The memory 750 may store information regarding written program codes and information regarding a processor for executing the program codes. Hardware configuration and an instruction set architecture (ISA) of the processor for executing the program codes may be stored in the memory 750. Examples of information regarding hardware configuration of a processor may include the number and types of functions units of the processor, the number of register files, connection relationship between the function units, and connection relationship between the function units and the register files.

A processor for executing program codes may be the processor of the scheduling apparatus 70 or the processor of another apparatus. Information regarding hardware configuration and an ISA of a processor stored in the memory 750 may be stored as read-only data. Furthermore, as described below, n schedulers includes in a modulo scheduler 742 may share read-only data stored in the memory 750.

Furthermore, the memory 750 may store instructions compiled by the compiler 740. The memory 750 may store an instruction schedule generated by the compiler 740.

The compiler 740 may eliminate meaningless dead codes, which are theoretically not executable, to reduce complexity of written program codes. The compiler 740 converts program codes, from which dead codes are removed, into a low-level language.

Meanwhile, if a processor for executing written program codes processes a loop and non-loop instructions via different modules, the compiler 740 partitions the written program codes into a loop and non-loop portion. For example, if the processor for executing the written program codes includes a Very Long Instruction Word (VLIW) module and a coarse grain reconfigurable array (CGRA), the compiler 740 may schedule to process the non-loop portion via the VLIW module and to process the loop via the CGRA.

The compiler 740 includes a VLIW scheduler 741 and the modulo scheduler 742. The VLIW scheduler 741 schedules to process a non-loop portion of program codes via a VLIW module. The VLIW scheduler 741 schedules instructions regarding a non-loop portion based on hardware information regarding the VLIW module.

The modulo scheduler 742 loads instructions for processing a loop from the memory 750. The modulo scheduler 742 analyzes the instruction for processing the loop and schedules operation of a processor for processing the loop. The modulo scheduler 742 calculates at least two candidate initiation intervals with respect to iterations in the loop adjacent to each other. The modulo scheduler 742 searches for schedules of instructions in parallel by using the calculated candidate initiation intervals. The modulo scheduler 742 selects one from among found schedules based on validity of the found schedules. Detailed descriptions of the modulo scheduler 742 will be given below with reference to FIG. 8.

The debugger 730 tracks errors in written program codes.

The simulator 720 provides a hardware environment similar to an external device for executing written program codes by embodying virtual hardware resources of the external device. For example, when it is assumed that the scheduling apparatus 70 is a PC and written program codes are to be executed on a smart phone, the simulator 720 embodies virtual hardware resources of the smart phone on the PC. By using the simulator 720, a software developer may perform a simulation similar to processing the program codes, which are written at the PC, at the smart phone.

The profiler 710 provides profiling information regarding written program codes. The profiling information may vary according to embodiments of the present invention and may include information regarding structure of a processor for executing the program codes. The profiling information is performance information regarding program codes and may include statistical data regarding information regarding usages of processor resources, time of executing program codes, information regarding memory usages, information regarding instruction schedules, etc. A software developer may estimate the overall performance of written program codes via the profiling information.

Figure 8:
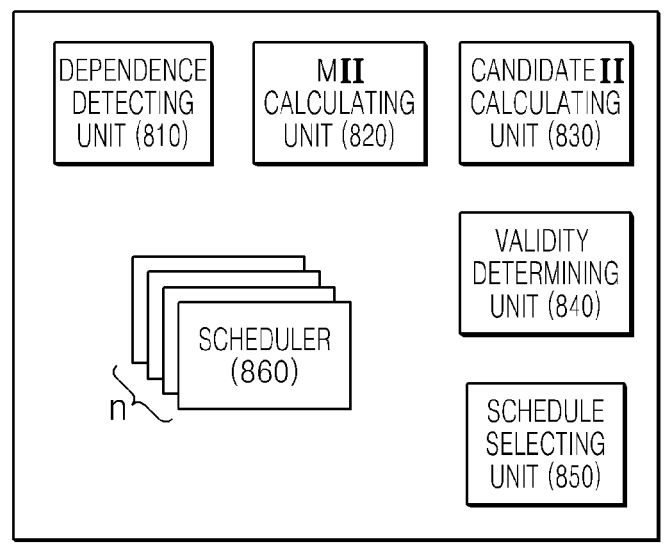
FIG. 8 is a diagram showing a modulo scheduler according to an embodiment of the present invention.

FIG. 8 is a diagram showing a modulo scheduler 80 according to an embodiment of the present invention. The modulo scheduler 80 shown in FIG. 8 may be the modulo scheduler 742 of the scheduling apparatus 70 shown in FIG. 7 or a modulo scheduler 910 of the scheduling apparatus 90 shown in FIG. 9. According to another embodiment of the present invention, the modulo scheduler 80 may be included in an apparatus separate from the scheduling apparatus 70 and the scheduling apparatus 90. The modulo scheduler 80 may be embodied as a processor for modulo scheduling.

Referring to FIG. 8, the modulo scheduler 80 includes a dependence detecting unit 810, a MII calculating unit 820, a candidate II calculating unit 830, n schedulers 860, a validity determining unit 840, and a schedule selecting unit 850. Any of descriptions thereof overlapping the descriptions given above will be omitted below.

The dependence detecting unit 810 analyzes dependences between instructions for processing a loop and builds a dependence graph.

The MII calculating unit 820 calculates a minimum initiation interval MII. The minimum initiation interval MII is either ResMII or RecMII, whichever is greater, where the ResMII is a smallest initiation interval calculated in consideration of resource constraint and RecMII is a smallest initiation interval calculated in consideration of recurrent constraint. The resource constraint refers to a pipelining constraint due to hardware configuration of a processor for processing a loop, whereas the recurrent constraint refers to a pipelining constraint based on dependences of instructions for processing a loop.

The candidate II calculating unit 830 calculates n candidate initiation intervals. n may be a natural number equal to or greater than 2. The candidate II calculating unit 830 may search for n candidate initiation intervals by increasing the minimum initiation interval MII by a constant interval. For example, the value CanII[i] of the $i^{th}$ candidate initiation interval from among the total n candidate initiation intervals may be calculated according to the Equation 3 described above. However, the present invention is not limited thereto, and the candidate II calculating unit 830 may calculate n candidate initiation intervals based on any of various rules.

According to an embodiment of the present invention, the candidate II calculating unit 830 may calculate n candidate initiation intervals within a designated range. The range of calculation may be limited by [minimum MinII, maximum MaxII]. The minimum MinII may be the largest value from among the previously calculated candidate initiation intervals, with which no valid schedule is found, plus 1. The maximum MaxII may be length of a loop or the smallest value from among the previously calculated candidate initiation intervals, with which a valid schedule is found, minus 1. The candidate II calculating unit 830 may either extract n candidate initiation intervals at a constant interval or randomly extract n candidate initiation intervals within the range of calculation.

When it is assumed that MII=1, length of a loop is 101, and n=5, the candidate II calculating unit 830 calculates 1, 21, 41, 61, and 101 as candidate initiation intervals. The n schedulers 860 search for schedules with respect to the candidate initiation intervals 1, 21, 41, 61, and 101. For example, the validity determining unit 840 determines that no valid schedule is found with respect to the candidate initiation intervals 1 and 21 and valid schedules are found with respect to the candidate initiation intervals 41, 61, and 101. The schedule selecting unit 850 does not select a schedule and request the candidate II calculating unit 830 to calculate candidate new initiation intervals in the range from 22 to 41. The candidate II calculating unit 830 calculates five new candidate initiation intervals 22, 24, 26, 28, and 40 in the range from 22 to 41. If no valid schedule is found with respect to the calculated candidate initiation intervals 22, 24, 26, 28, and 40, the schedule selecting unit 850 selects the schedule having the fastest speed of the loop from among the valid schedules found during the previous schedule search, that is, a schedule corresponding to the initiation interval 41. It is assumed that no valid schedule is found with respect to the calculated candidate initiation intervals 22 and 24 and valid schedules are found with respect to the candidate initiation intervals 26, 28, and 40. Here, since both the maximum and the minimum of the range of calculation are 25, the candidate II calculating unit 830 calculates the initiation interval 25 as a candidate initiation interval without calculating five candidate initiation intervals. If a valid schedule is found in correspondence to the candidate initiation interval 25, a schedule corresponding to the candidate initiation interval 25 is selected. On the contrary, if no valid schedule is found with respect to the candidate initiation interval 25, the schedule selecting unit 850 selects the schedule having the fastest speed of the loop from among the valid schedules found during the previous schedule search, that is, a schedule corresponding to the initiation interval 26.

It would have been obvious to one of ordinary skill in the art that, other than the embodiments described above, the candidate II calculating unit 830 may calculate n candidate initiation intervals by using any of various methods to simultaneously search for n instruction schedules in parallel.

Each of the n schedulers 860 receives an input of one candidate initiation interval and searches for executable schedules with respect to the input candidate initiation interval. For example, the n schedulers 860 may search for schedules by building a module reservation table (MRT) with respect to the input candidate initiation intervals.

The validity determining unit 840 determines validity of the n found schedules.

The schedule selecting unit 850 selects one from among the n schedules based on validity of the n schedules. If m(0<n≤m) valid schedules are found with respect to n candidate initiation intervals, the schedule selecting unit 850 selects one from among the m valid schedules. The scheduling apparatus schedule selecting unit 850 may select the schedule having the fastest speed of the loop from among the m valid schedules. There are m candidate initiation intervals corresponding to the m valid schedules, where the schedule selecting unit 850 may select one schedule based on sizes of the m candidate initiation intervals. For example, the schedule selecting unit 850 may select a schedule corresponding to the smallest initiation interval from among the m candidate initiation intervals.

Meanwhile, if it is determined that all schedules with respect to the n candidate initiation intervals are not valid, the schedule selecting unit 850 updates the n candidate initiation intervals. For example, the schedule selecting unit 850 requests the candidate II calculating unit 830 to calculate n new candidate initiation intervals.

FIG. 9 is a diagram showing a scheduling apparatus 90 according to another embodiment of the present invention. Any of descriptions thereof overlapping the descriptions given above will be omitted below. Referring to FIG. 9, the scheduling apparatus 90 includes the modulo scheduler 910, a reconfigurable memory 920, a common register file 940, a VLIW instruction memory 930, a plurality of function units, and a plurality of register files. The scheduling apparatus 90 may be embodied with a reconfigurable processor (RP).

In the scheduling apparatus 90, a portion 960 indicated with a dotted line constitutes a VLIW module for executing instructions of a non-loop portion. A portion 970 indicated with a dotted line constitutes a CGRA for executing instructions of a loop. However, according to embodiments of the present invention, a loop may be processed by the VLIW module 960 or a non-loop portion may be processed by the CGRA 970. The scheduling apparatus 90 may operate alternately in CGRA mode and VLIW mode.

The CGRA 970 includes a plurality of function units and a plurality of register files. To improve efficiency of executing instructions, the CGRA 970 may dynamically configure operation flows of the respective function units and the respective register files or logical connection relationships therebetween.

Each register file stores data input/output with respect to respective function units or bypasses data input/output with respect to another register file.

The reconfigurable memory 920 may store hardware information regarding the CGRA 970, such as types of components, number of the components, and physical connections between the components. The reconfigurable memory 920 may store information regarding ISA. The reconfigurable memory 920 may store instructions for processing a loop. The above-stated information may be stored in the reconfigurable memory 920 as read-only data. Furthermore, the reconfigurable memory 920 may receive an input of a schedule regarding instruction for processing a loop from the modulo scheduler 910 and store the schedule. In the CGRA 970, inter-iteration dependent instructions or input/output values may be stored in the common register file 940. Therefore, when an interruption is detected, data stored in the common register file 940 may be written to a data memory (not shown).

In the VLIW module 960, the VLIW instruction memory 930 stores VLIW instructions regarding a non-loop portion and a schedule regarding the VLIW instructions. The common register file 940 either stores data input/output with respect to function units included in the VLIW module 960 or instructions fetched from the VLIW instruction memory 930. Data stored in the common register file 940 may be shared by the function units included in the VLIW module 960. Data stored in the common register file 940 may be written to a data memory (not shown). According to embodiments of the present invention, the scheduling apparatus 90 may further includes a VLIW scheduler (not shown) for scheduling VLIW instructions.

The modulo scheduler 910 loads instructions for processing a loop from a data memory (not shown) or the reconfigurable memory 920. The modulo scheduler 910 analyzes the instructions for processing the loop and schedules operation of the CGRA 970 for processing the loop. The modulo scheduler 910 calculates at least two candidate initiation intervals with respect to initiation intervals of iterations of the loop adjacent to each other. The modulo scheduler 910 searches for schedule of instructions in parallel by using the calculated candidate initiation intervals. The modulo scheduler 910 selects one from among found schedules based on validity of the schedules. The modulo scheduler 910 stores the found schedule in the reconfigurable memory 920. The detailed descriptions of the modulo scheduler 910 are given above with reference to FIG. 8.

The scheduling apparatus 70, the modulo scheduler 80, or the scheduling apparatus 90 may be embodied with various types of processors, chips, or systems. For example, the scheduling apparatus 70, the modulo scheduler 80, or the scheduling apparatus 90 may be embodied with any of processors including a reconfigurable processor (RP), a coarse grained array (CGA), a fine grained array (FGA), a digital signal processor (DSP), an application-specific instruction-set processor (ASIP), a central processing unit (CPU), a graphic processing unit (GPU), etc. Furthermore, the scheduling apparatus 70, the modulo scheduler 80, or the scheduling apparatus 90 may be embodied as a discrete chip including a processor or a system on a chip (SoC). Furthermore, the scheduling apparatus 70, the modulo scheduler 80, or the scheduling apparatus 90 may be embodied as an apparatus or a system including a processor, such as a PC, a server computer, a smart phone, a PDA, a PMP, a navigation, a TV, a content playback apparatus, a communication system, an image processing system, a graphics processing system, a laptop, or a tablet PC or may be included therein.

As described above, according to the one or more of the above embodiments of the present invention, since schedules with respect to a plurality of initiation intervals II are searched for in parallel, an optimized initiation interval may be quickly found in modulo scheduling.

According to an embodiment, provided is a method of scheduling instructions, including searching instruction schedules using a first set of initiation intervals calculated between adjacent iterations in a loop, and selecting an instruction schedule among the instruction schedules searched when valid respect to at least one of the first set of the initiation intervals. The method according to an aspect includes calculating a second set of initiation intervals when the instruction schedules searched using the first set of initiation intervals are invalid.

The scheduling apparatus 70, the modulo scheduler 80, or the scheduling apparatus 90 may be embodied as any of various types of processors, chips, or systems. For example, the scheduling apparatus 70, the modulo scheduler 80, or the scheduling apparatus 90 may be embodied as a processor, such as a reconfigurable processor (RP), a coarse grained array (CGA), a fine grained array (FGA), a digital signal processor (DSP), an application-specific instruction-set processor (ASIP), a central processing unit (CPU), or a graphic processing unit (GPU). Furthermore, the scheduling apparatus 70, the modulo scheduler 80, or the scheduling apparatus 90 may be embodied as a discrete chip including a processor or a system-on-chip (SoC). Furthermore, the scheduling apparatus 70, the modulo scheduler 80, or the scheduling apparatus 90 may be embodied as or included in an apparatus or a system including a processor, a personal computer (PC), a server computer, a smart phone, a personal digital assistant (PDA), a portable multimedia player (PMP), a navigation device, a TV, a content playback apparatus, a communication system, an image processing system, a graphics processing system, a laptop PC, or a tablet PC.

In addition, other embodiments of the present invention can also be implemented through computer readable code/instructions in/on a medium, e.g., a computer readable medium, to control at least one processing element to implement any above described embodiment. The medium can correspond to any medium/media permitting the storage and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A method of modulo scheduling instructions for processing a loop, the method comprising:
    obtaining at least two candidate initiation intervals between adjacent iterations;
    generating N schedulers according to a number N of the obtained candidate initiation intervals;
    searching for N schedules with respect to the candidate initiation intervals in parallel via the N schedulers; and
    selecting a schedule determined to be valid from among the searched schedules.

2. The method of claim 1, wherein, in the obtaining of the candidate initiation intervals, N initiation intervals are obtained by increasing a minimum initiation interval, which is calculated in advance, according to a designated rule.

3. The method of claim 1, further comprising:
    setting information regarding a processor for processing the loop and information regarding the instructions to read-only data,
    wherein the read-only data is shared by the N schedulers.

4. The method of claim 1, wherein, in the selecting of the schedule, when determining two or more schedules from among the searched schedules are valid, a schedule corresponding to a smallest candidate initiation interval is selected from among the valid schedules.

5. The method of claim 1, further comprising:
    increasing each of the candidate initiation intervals by a number N of the candidate initiation intervals when determining the search schedules are other than valid.

6. The method of claim 1, further comprising:
    generating a dependence graph between the instructions; and calculating a minimum initiation interval in consideration of a resource constraint of a processor for processing the loop and recurrent constraint based on dependences between the instructions.

7. The method of claim 6, wherein the calculating of the minimum initiation interval comprises:
selecting a larger value from between a first initiation interval calculated based on the resource constraint, and a second initiation interval calculated based on the recurrent constraint as the minimum initiation interval.

8. The method of claim 1, wherein the searching for N schedules with respect to the candidate initiation intervals in parallel comprises:
generating modulo reservation tables using the candidate initiation intervals.

9. A non-transitory computer readable recording medium having recorded thereon program codes for implementing an operation, comprising:
obtaining at least two candidate initiation intervals between adjacent iterations;
generating N schedulers according to a number N of the obtained candidate initiation intervals;
searching for N schedules with respect to the candidate initiation intervals in parallel via the N schedulers; and
selecting a schedule determined to be valid from among the searched schedules.

10. An instruction scheduling apparatus, comprising:
a memory, which stores instructions for processing a loop; and
a modulo scheduler, which analyzes the instructions and schedules operation of a processor for processing the loop,
wherein the modulo scheduler obtains at least two candidate initiation intervals between adjacent iterations, searches for schedules of the instructions in parallel by using the candidate initiation intervals, selects a schedule determined to be valid from among the searched schedules, and the modulo scheduler comprises N schedulers, which search for N schedules with respect to the candidate initiation intervals in parallel via the N schedulers.

11. The instruction scheduling apparatus of claim 10, wherein the modulo scheduler obtains N initiation intervals as the candidate initiation intervals by increasing a minimum initiation interval, which is calculated in advance, according to a designated rule.

12. The instruction scheduling apparatus of claim 10, wherein the memory sets information regarding a processor for processing the loop and information regarding the instructions to read-only data, and
the read-only data is shared by the N schedulers.

13. The instruction scheduling apparatus of claim 10, wherein, when determining two or more schedules from among the searched schedules are valid, the modulo scheduler selects a schedule corresponding to a smallest candidate initiation interval from among the valid schedules.

14. The instruction scheduling apparatus of claim 10, wherein, when determining the searched schedules are other than valid, the modulo scheduler updates the candidate initiation intervals by increasing each of the candidate initiation intervals by a number N of the candidate initiation intervals.

15. The instruction scheduling apparatus of claim 10, wherein the modulo scheduler comprises:
a dependence detecting unit, which generates a dependence graph between the instructions; and
a minimum initiation interval calculating unit, which calculates a minimum initiation interval in consideration of resource constraint of a processor for processing the loop and recurrent constraint based on dependences between the instructions.

16. The instruction scheduling apparatus of claim 15, wherein the minimum initiation interval calculating unit selects a larger value from between a first initiation interval calculated based on the resource constraint and a second initiation interval calculated based on the recurrent constraint as the minimum initiation interval.

17. The instruction scheduling apparatus of claim 10, wherein the modulo scheduler generates modulo reservation tables using the candidate initiation intervals.

18. The instruction scheduling apparatus of claim 10, wherein the processor for processing the loop comprises:
a Very Long Instruction Word (VLIW) module and a coarse grain reconfigurable array (CGRA), and the modulo scheduler schedules, such that the loop is processed by the CGRA.

* * * * *